United States Patent
Day

(10) Patent No.: US 10,661,206 B2
(45) Date of Patent: May 26, 2020

(54) FILTER PAD FOR RAPID REMOVAL

(71) Applicant: Timothy Day, Houston, TX (US)

(72) Inventor: Timothy Day, Houston, TX (US)

(73) Assignee: Day Enterprises LLC, Houston, TX (US)

( * ) Notice: Subject to any disclaimer, the term of this patent is extended or adjusted under 35 U.S.C. 154(b) by 0 days.

(21) Appl. No.: 16/430,695

(22) Filed: Jun. 4, 2019

(65) Prior Publication Data

US 2019/0299130 A1    Oct. 3, 2019

Related U.S. Application Data

(63) Continuation-in-part of application No. 16/009,740, filed on Jun. 15, 2018, which is a continuation-in-part of application No. 15/590,080, filed on May 9, 2017, now Pat. No. 10,022,656.

(60) Provisional application No. 62/334,080, filed on May 10, 2016.

(51) Int. Cl.
   *C02F 11/12* (2019.01)
   *B01D 29/96* (2006.01)
   *B01D 29/27* (2006.01)

(52) U.S. Cl.
   CPC .............. *B01D 29/96* (2013.01); *B01D 29/27* (2013.01); *B01D 2201/04* (2013.01); *B01D 2201/40* (2013.01)

(58) Field of Classification Search
   CPC ........ C02F 11/128; C02F 11/12; B01D 29/96; B01D 29/27; B01D 2201/40; B01D 2201/04

USPC ........................................ 210/241, 455, 482
See application file for complete search history.

(56) References Cited

U.S. PATENT DOCUMENTS

| | | |
|---|---|---|
| 4,396,509 A | 8/1983 | Foyn |
| 4,929,353 A | 5/1990 | Harris |
| 5,449,468 A | 9/1995 | Trummel |
| 5,507,859 A | 8/1996 | Kaiser |
| 7,045,068 B2 | 5/2006 | Hutchinson et al. |
| 7,240,681 B2 | 7/2007 | Salk |
| 7,581,647 B2 | 9/2009 | Grichar et al. |
| 7,820,045 B2 | 10/2010 | Caughman |
| 7,943,051 B2 | 5/2011 | Dieziger |

(Continued)

OTHER PUBLICATIONS

Bucks Fabricating—Roll Off Containers webpage; www.bucksfab.com; 12123/2015.

(Continued)

*Primary Examiner* — Thomas M Lithgow
(74) *Attorney, Agent, or Firm* — FisherBroyles LLP; Anthony Dovale; Rachel Huffstetler

(57) ABSTRACT

A filter pad for use in a dewatering container is presented. The filter pad is configured to fit within the interior cavity and substantially line the interior surfaces. Material, which is usually liquids and slurries, is added to the container with the filter in place and gravity is used to filter the sediment, while the water is released through a release nozzle. The solids are retained in the filter pad for later disposal. The filter pad has a portion that can be selectively opened and is configured for placement substantially adjacent the door to permit selective egress of contents of the interior cavity. The filter pad has an open upper end with securing members for cooperating with container hooks to provide safe and easy removal of the filter pad.

21 Claims, 6 Drawing Sheets

(56) References Cited

U.S. PATENT DOCUMENTS

| | | |
|---|---|---|
| 8,070,960 B2 | 12/2011 | Conwell |
| 2010/0294730 A1 | 11/2010 | Weston |
| 2011/0056519 A1 | 3/2011 | Card et al. |
| 2014/0048475 A1* | 2/2014 | James .................... C02F 1/004 |
| | | 210/477 |
| 2017/0326480 A1* | 11/2017 | Day ...................... B01D 29/05 |

OTHER PUBLICATIONS

MHF Packaging Solutions Brochure; dale unknown but at least as early as Jan. 25, 2016.
C.I.Agents Solutions webpage; www.ciagenl.com/wastewater-dewatering-and-fillralion/vault-sump-fillers/; Dec. 23, 2015.
DePac Dewatering Liners and Fillers, brochure, dale unknown; presumed prior to May 10, 2016.
DePac Transliner Dispocable Container Liners, brochure, dale unknown; presumed prior to May 10, 2016.
City develops innovative solution of disposing of sewer residuals, Chuck Schroeder, Public Works 134.2, Feb. 2003.

* cited by examiner

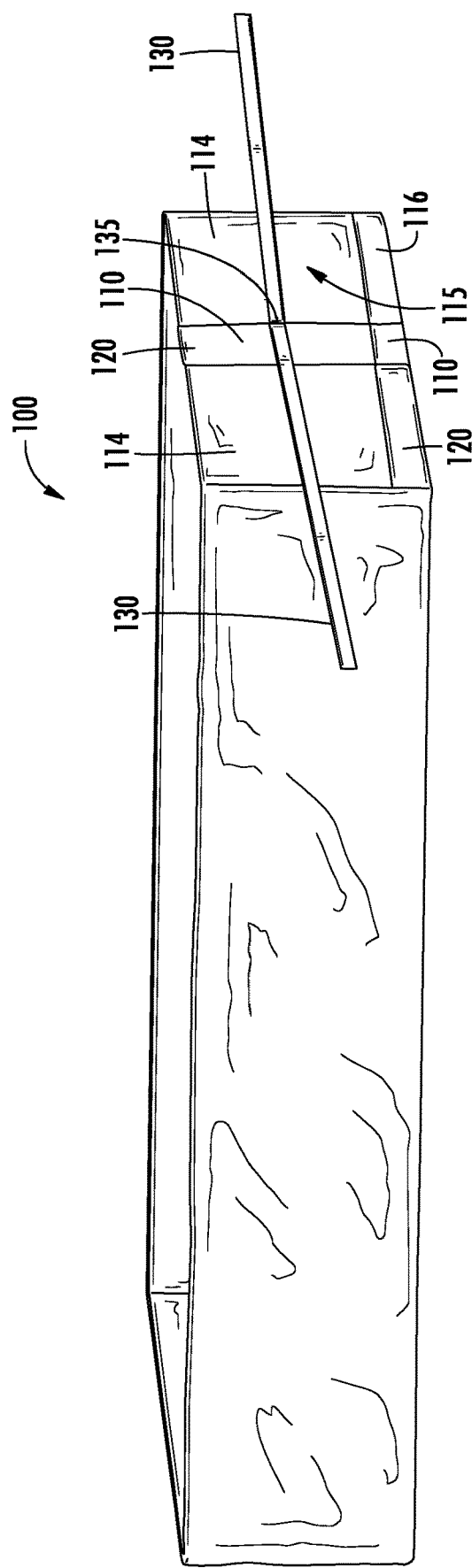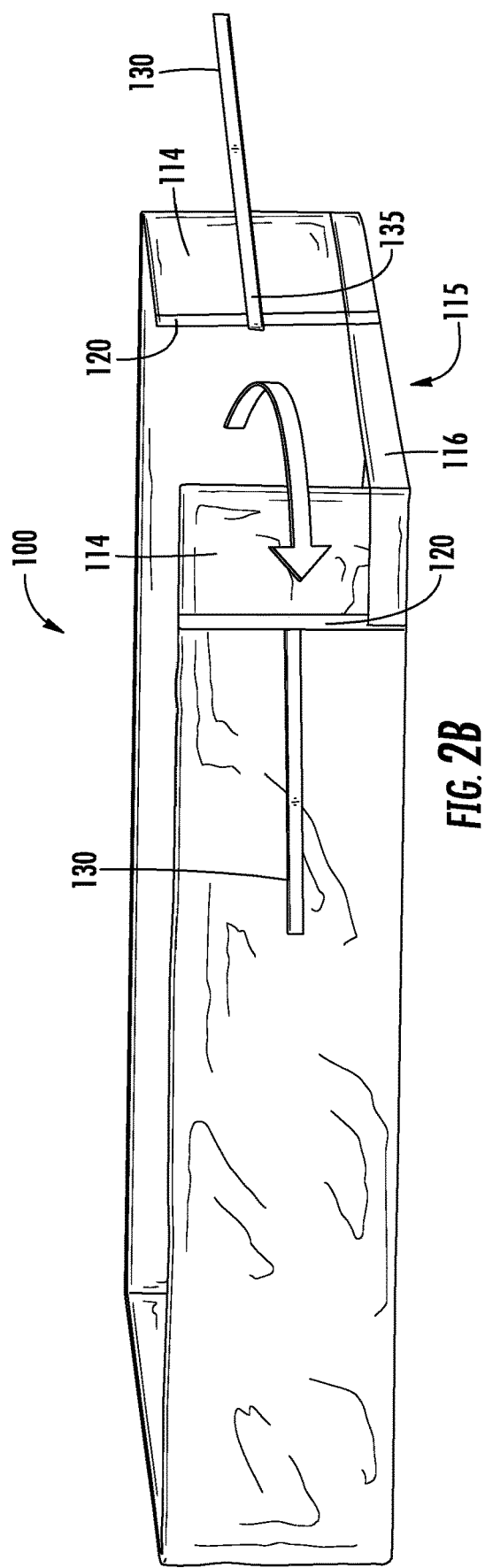

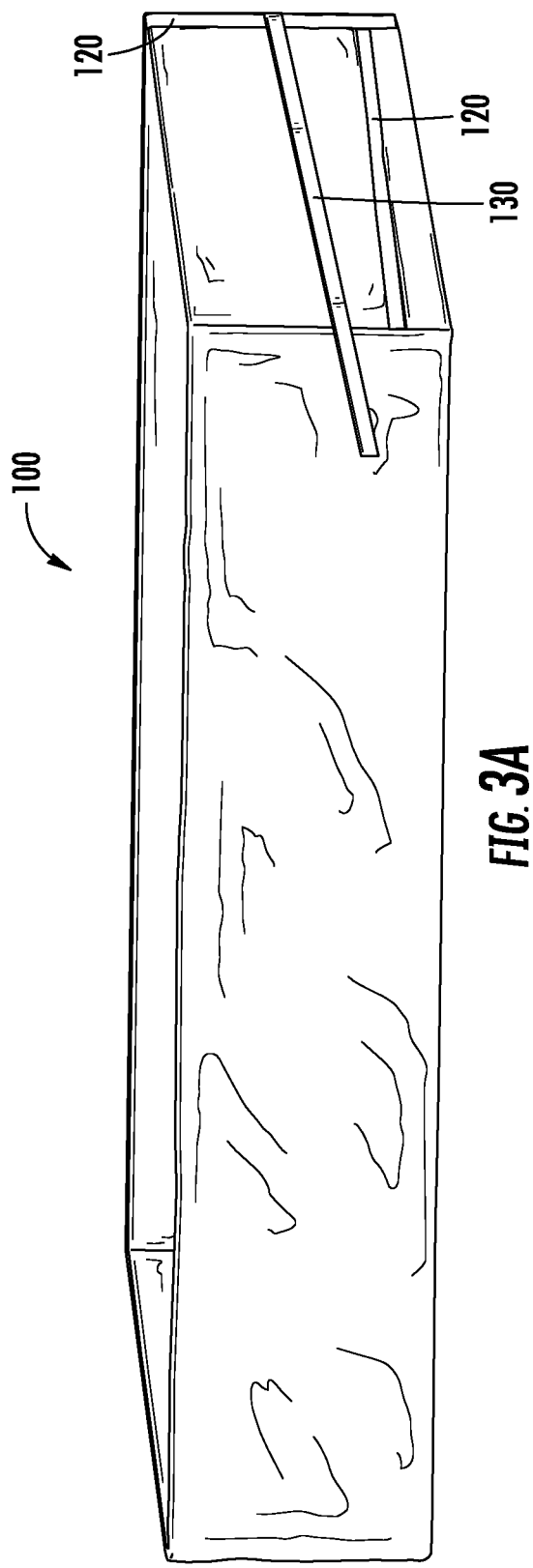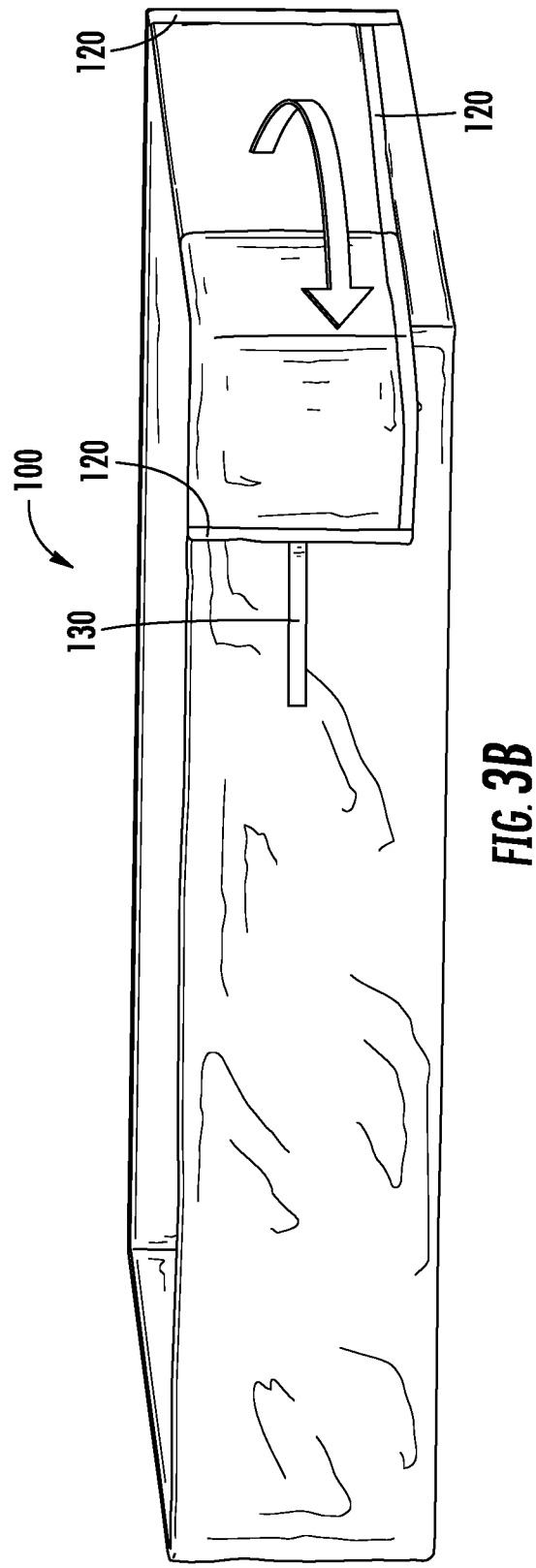

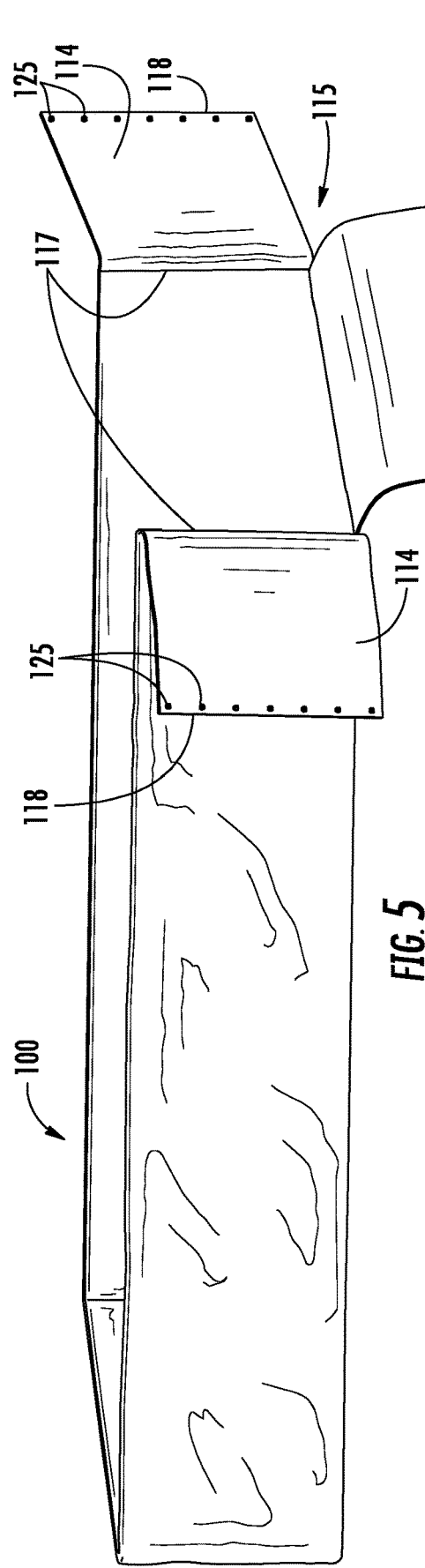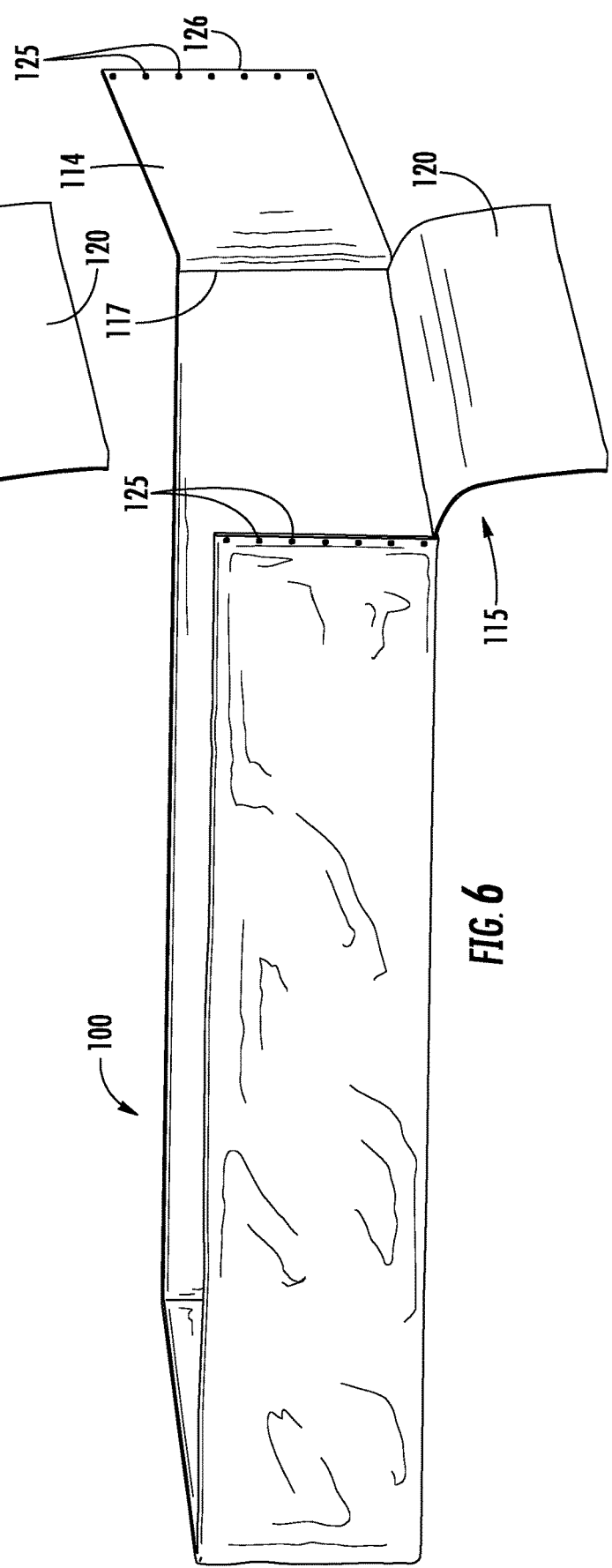

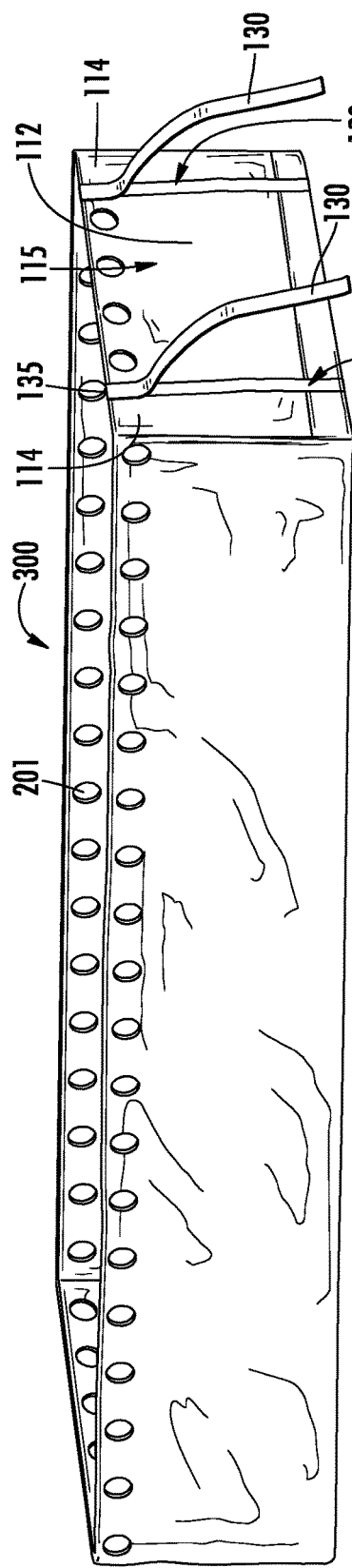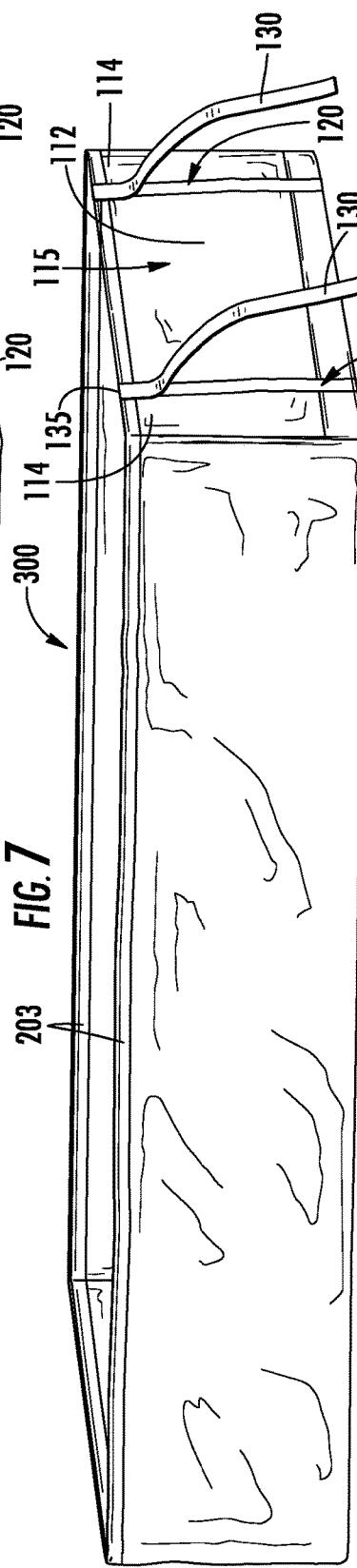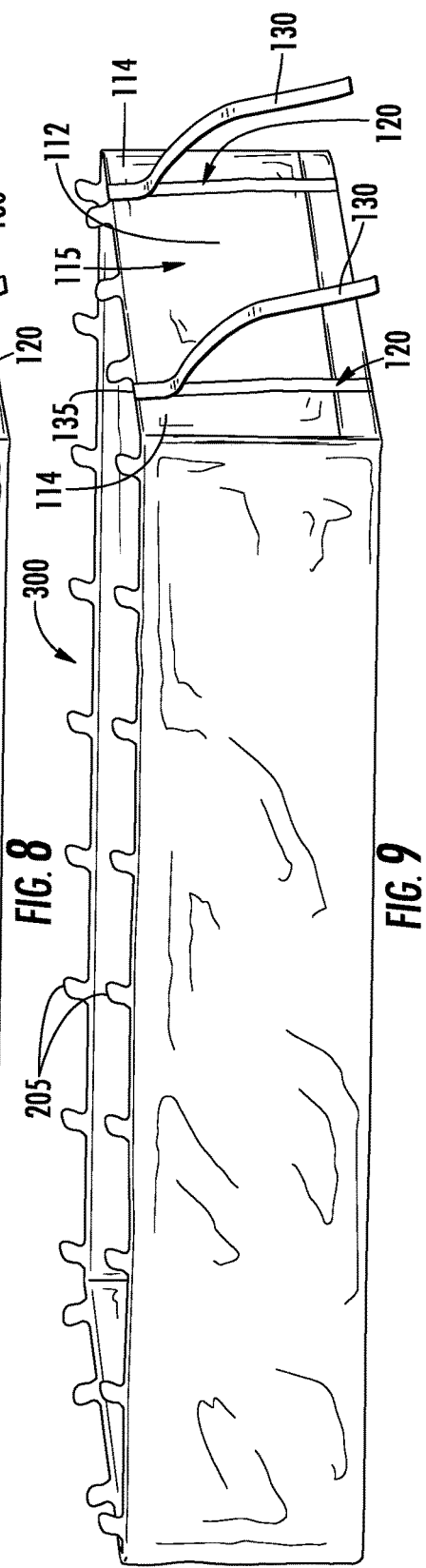

FILTER PAD FOR RAPID REMOVAL

CROSS REFERENCE TO RELATED APPLICATIONS

This application is a continuation-in part of and claims the benefit of Ser. No. 16/009,740, filed Jun. 15, 2018, which is a continuation-in part of U.S. patent application Ser. No. 15/590,080, filed May 9, 2017, which claim the benefit of US Provisional Pat. Application No. 62/334,080 filed May 10, 2016, the disclosures of which are hereby incorporated by reference.

FIELD OF THE INVENTION

The present invention relates generally to filter pads, most particularly for use in a filter pad that fits standard dewatering containers.

BACKGROUND OF THE INVENTION

Generally, filter pads are universal enough that they fit standard containers. Commonly, dewatering containers are based on a roll-away dumpster design, also known in the industry as roll-off containers. There are basically two varieties of these dewatering containers: those that have permanent filters and those that use disposable filters.

Container filters can be trailer-mounted for easy hauling, or permanently mounted on a tipping stand so that the cake can be unloaded on site. Within the permanent filter category there are multiple configurations of filter orientation, materials of construction, and filter porosity. The most common type of disposable filter is a needle punched polypropylene geotextile. This material is typically folded in half lengthwise and the ends sewn together creating an "envelope". It is then inserted into a container with the top edges folded over the top sides of the container.

The support structure for the disposable filters can be bar grating, expanded metal, perforated plate or other rigid porous material that can support the weight of the solids. These plates are set off from the sides and bottom so that liquids can drain from the material and then be decanted. There are usually drain ports in the container through which the effluent is discharged. These are typically placed on the bottom of the container or at the bottom of the door and have a shut off valve and safety cap. In rare cases, of a roll-off type disposable filter box, the door can simply be left slightly open (but secured with a latch).

Most often, dewatering boxes are used on a variety of waste streams and are allowed to gravity drain in whatever time frame was necessary to reach the desired cake dryness. Effluent water from a dewatering box can go back to the headworks of the plant virtually devoid of solids or removed by a vacuum truck or similar means.

The main reason to choose a dewatering container is their simple operation. The dewatering container itself has no moving parts. The waste is processed in the same unit in which it is hauled away and dumped, thus limiting the handling of the sludge. The dewatering box will give volume reductions in the 80% to 95% liquid range depending on the percent solids in the sludge. The cake produced by the dewatering box will pass the "paint filter" test and can go to the local landfill. The effluent water from the dewatering box can go back to the headworks of the plant virtually devoid of solids.

To empty the container, the operator generally cuts the filter with a knife and dumps the content. The process is inefficient and sometimes dangerous. There is no way to control the solids dumping from the container as the operator cuts the pad. This positions the operator in close proximity to the material and, in most cases, the operator contacts the solids as they dump.

Likewise, once the dewatered contents contained in the filter are emptied, the process of removing the filter from the container itself must be accomplished. This routinely requires the operator to enter the container and "cut" or "tug" the liner free of the container. In some cases, mechanical equipment. such as a backhoe, must be used to expedite the process. This procedure places the operator in a dangerous environment.

Accordingly, it remains desirable in the pertinent art to provide filter pad to address the limitations associated with known filter pads, including but not limited to those limitations discussed above.

SUMMARY OF THE INVENTION

Presented herein is a filter pad system for use in a dewatering container. A standard dewatering container has a bottom and a plurality of sides. The bottom and sides have interior surfaces that define an interior cavity. One of the sides of the container comprises a door to permit ingress and egress into the interior cavity.

In another aspect, there can be a filter pad configured to fit within the interior cavity and substantially line the interior surfaces. Filter pads, in general, are universal enough to fit in standard containers. The filter pad is generally slightly larger than the interior portion of the container to overlap the sidewalls. Pads are usually held in place by some sort of clips, hooks or duct tape, but any conventional fastening system is contemplated. Most dewatering containers are prefabricated with hooks placed along the inside top edge of the container. The hooks are tack welded to the side, end and door walls and spaced at regular intervals and provide a means of fastening the filter to the container for loading purposes. The placement of the filter is usually done by the operator.

In an exemplified aspect, material, which is usually liquids and slurries, is added to the container with the filter in place and gravity is used to filter the sediment, while the water is released through a release nozzle. The solids are retained in the filter pad for later disposal. The filter pad has a portion that can be selectively opened and is configured for placement substantially adjacent the door to permit selective egress of contents of the interior cavity. This can be facilitated by having one or more separations defined in a portion of the filter pad adjacent the door, selectively closed by one or more fasteners. Extensions are advantageously provided to facilitated opening of the fasteners for content egress and are of a predetermined length and configuration enabling operation from distance, away from the content discharge. This allows the operator to stay out of harm's way and provide for off-loading of the solids. In effect, a win-win all the way around.

After the liquids and slurries have been filtered from the filter pad within the container, and after the solids have been removed utilizing the novel end filter pad end configuration (adjacent container door), the filter must be readily removed. According to one aspect of the invention, this is achieved by the filter pad having securing means adjacent and along its open, upper edge to both secure the filter pad to the container hooks and to facilitate rapid and easy removal of the filter pad from the container.

Related methods of operation are also provided. Other apparatuses, methods, systems, features, and advantages of the filter pads and the method of their use will be or become apparent to one with skill in the art upon examination of the following figures and detailed description. It is intended that all such additional apparatuses, methods, systems, features, and advantages be included within this description, be within the scope of the filter pads and the method of their use and be protected by the accompanying claims.

DESCRIPTION OF THE FIGURES

FIG. 2A is a perspective view of a filter pad according to one aspect of the present invention;

FIG. 2B is a perspective view of the filter pad of FIG. 2A in a partially opened position;

FIG. 3A is a perspective view of a filter pad according to another aspect of the present invention;

FIG. 3B is a perspective view of the filter pad of FIG. 3A in a partially opened position;

FIG. 5 is a perspective view of the filter pad according to another aspect of the present invention;

FIG. 6 is a perspective view of a filter pad according to another aspect of the present invention;

FIG. 7 is a perspective view of a filter pad according to another aspect of the present invention;

FIG. 8 is a perspective view of a filter pad according to another aspect of the present invention; and FIG. 9 is a perspective view of a filter according to another aspect of the invention.

DESCRIPTION OF THE INVENTION

Figure 1:
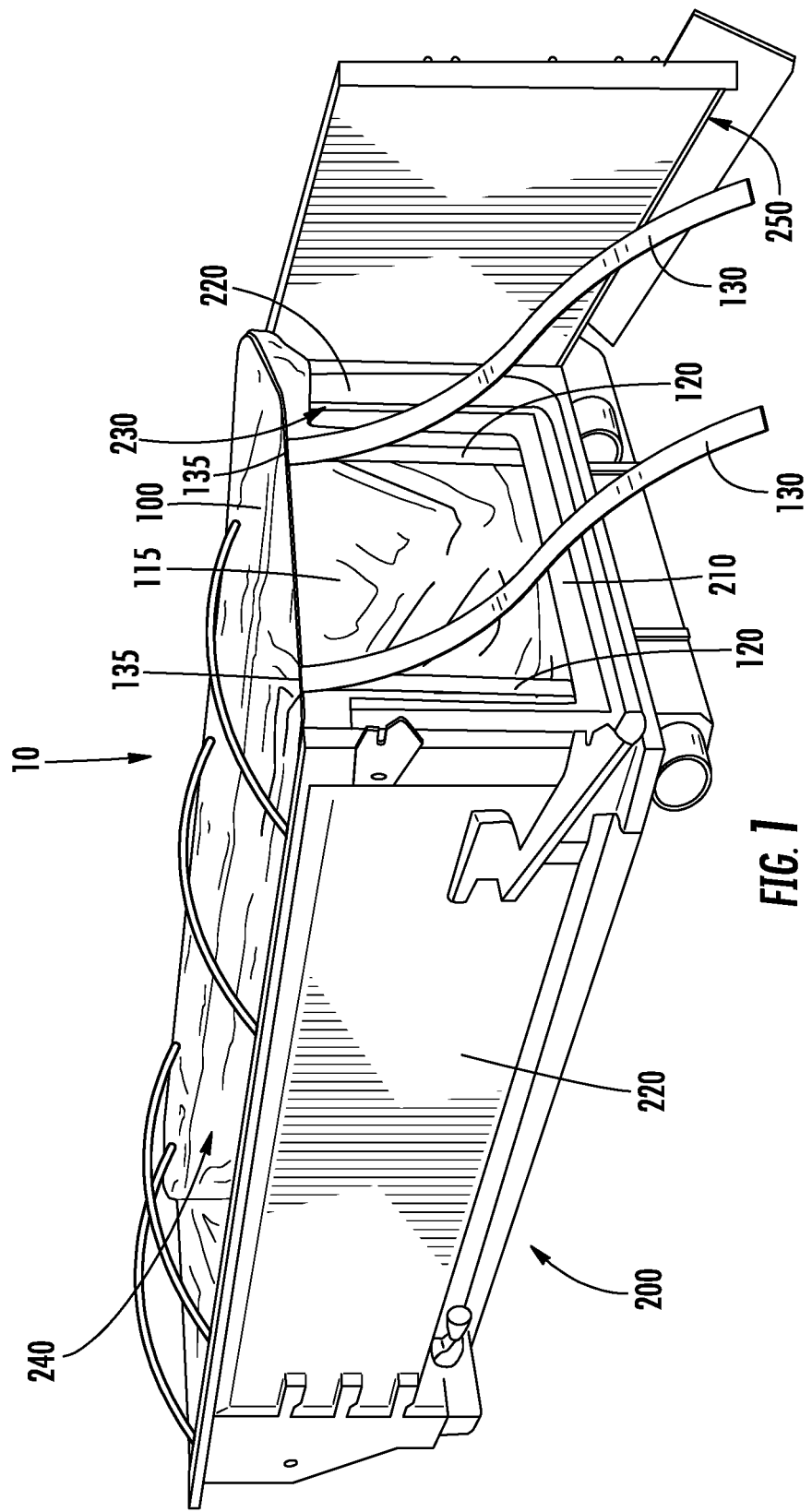
FIG. 1 is a perspective view of a prior art dewatering container.

The present invention can be understood more readily by reference to the following detailed description, examples, and claims, and their previous and following description. Before the present system, devices, and/or methods are disclosed and described, it is to be understood that this invention is not limited to the specific systems, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. Those skilled in the relevant art will recognize that many changes can be made to the aspects described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "filter" includes aspects having two or more filters unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Terms used herein, such as "exemplary" or "exemplified," are not meant to show preference, but rather to explain that the aspect discussed thereafter is merely one example of the aspect presented.

The term "substantially," as used herein, may be applied to modify any quantitative representation which could permissibly vary without resulting in a change in the basic function to which it is related.

Additionally, descriptive terms, such as "first" or "second" do not necessarily connote plural referents. Alternatively, these terms are merely used to differentiate one object from another or to simply describe a single object. They are not necessarily to be considered in numerical order. For example, a "first object" could just as easily be named "object A" or the like.

Reference will now be made in detail to various embodiments of the present invention, examples of which are illustrated in the accompanying drawings. Wherever possible, the same reference numbers are used throughout the drawings to refer to the same or like parts.

In one aspect, presented herein is a filter pad system 10 for use with a dewatering container 200. A standard dewatering container 200 has a bottom 210 and a plurality of sides 220. The bottom and sides have interior surfaces 230 that define an interior cavity 240. One of the sides of the container comprises a door 250 to permit ingress and egress into the interior cavity. As shown, the container 200 and filter pad are generally rectangular, but container's and filter pads with other quadrilateral or non-quadrilateral (for example, cylindrical) shapes may also be used for a filter pad system according to the present invention.

In another aspect, the filter pad system 10 comprises a filter pad 100 configured to fit within the interior cavity 240 and substantially line the interior surfaces 230. Filter pads, in general, are universal enough to fit in standard containers. The nominal size of containers are 21 feet in length, 8 feet wide, and 5 feet high. Of course, sizes can vary and not all containers are the same size. In an exemplified aspect, the container can be approximately 4', 6', or 8' in height. These sizes are merely examples and not meant to be limiting. The filter pad is generally slightly larger than the interior portion of the container in order to overlap the sidewalls. Pads are usually held in place by some sort of clips, hooks or duct tape, but any conventional fastening system is contemplated. This placement is usually done by the operator.

In an exemplified aspect, material, which is usually liquids and slurries, is added to the container with the filter in place and gravity is used to filter the sediment, while the water is released through a release nozzle. The solids are retained in the filter pad for later disposal. Occasionally, a vacuum or a pump can be used to assist the dewatering process. The filter pad can be, for example and not meant to be limiting, from about 100 to about 600 microns, referring to pore size. In another aspect, the filter pad can be from about 200 to about 500 microns. In yet another aspect, the filter pad can be from about 300 to about 400 microns. An exemplary material for forming the filter pad is PET (Poly-Ethylene Terephthalate), or the like. Of course, other materials, natural or engineered, may be selected.

In one aspect, the filter pad 100 has a portion that can be selectively opened and is configured for placement substantially adjacent the door to permit selective egress of contents of the interior cavity. This can be facilitated by having one or more separations 110 defined by an outer surface or opening surface 115 of the filter pad 100 adjacent the door 250, selectively closed by one or more fasteners 120. As shown, the door 250 and separations 110 are provided on a container 200 end surface but may be provided a side surface, or even a top or bottom surface for accommodating differently configured containers 200. The fasteners 120 can be, for example and not meant to be limiting, at least one zipper, hook and loop material, snaps, and the like. As shown, fasteners 120 are formed hook and loop mating material. Fasteners 120 in the form of snaps are shown in FIGS. 5 and 6. The separations 110 can be positioned in a variety of manners for defining various panels forming the end surface 115. For instance, there can be separations running vertically along the side edges of the filter pad, along with a separation along the bottom edge, as in FIGS. 1, 4A and 4B for facilitating opening of the opening surface 115. There can also be a central vertical separation for defining more than one panel forming the end surface 115 and a bottom separation with overlapping side portions, as in FIGS. 2A and 2B. There may also be separations along a single side edges bottom, as in FIGS. 3A and 3B for opening of the surface 115 sideways. Other configurations are also contemplated.

It is also contemplated that, in one aspect, the filter pad can comprise one or more stiffeners adjacent the separations for stability or the panel portion adjacent the separations may be self-stiffening. The filter pad may be self-stiffening wherein a hem or material fold is providing along edges bordering the separations. Alternatively, the stiffeners can be inserted into the pad and can comprise plastic, cardboard, or other sufficiently rigid material.

In yet another aspect, the filter pad system also comprises at least one opening extension 130 attached to a portion of the filter pad to facilitate opening the portion of the filter pad from a distance to permit an operator to be out of the way of during egress of the contents of the interior cavity. The extension can be, for example and not meant to be limiting, fabric, a rope, chain, pole, or other device that extends one's reach. One or more extensions may be provided. A pair of extensions 130 are shown in the various Figures and a single extension is shown in FIGS. 3A and 3B. The illustrated example of FIGS. 1, 2 and 4 include a pair of fore ends 135 secured to the end panel 115 at two locations, e.g., an upper and lower location, and an aft end for user manipulation.

Figure 4A:
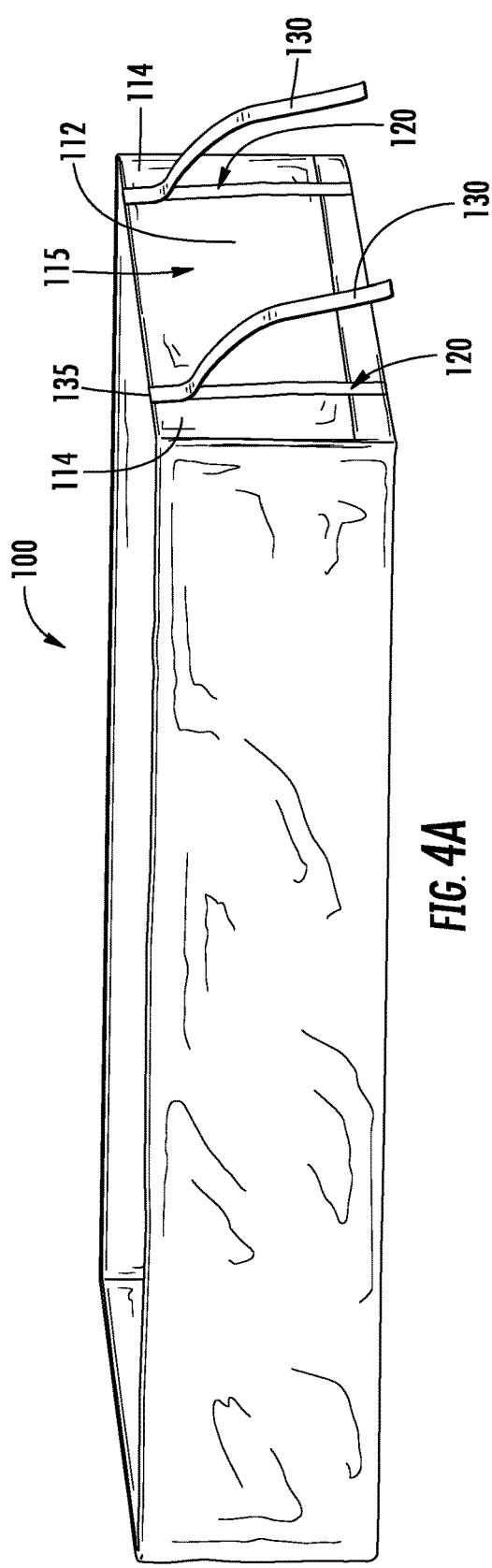
FIG. 4A is a perspective of a filter pad according to another aspect of the present invention.
Figure 4B:
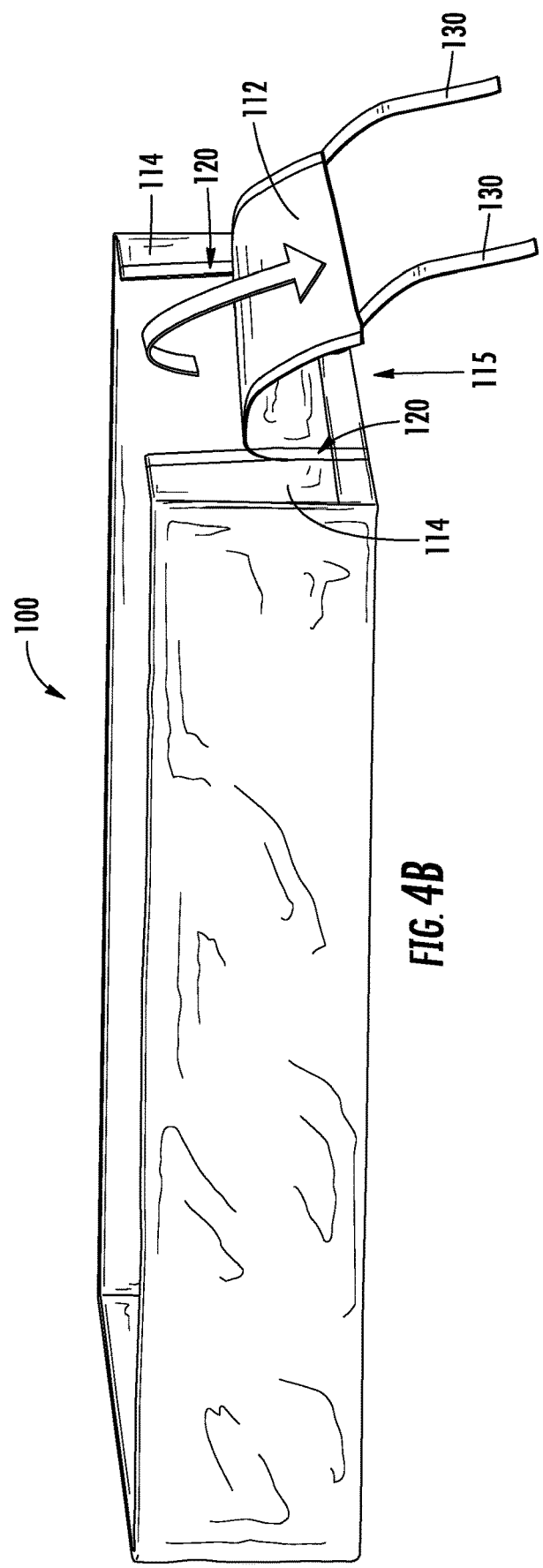
FIG. 4B is a perspective view of the filter pad of FIG. 4A in a partially opened position.

As shown in FIGS. 1, 4A and 4B, the extensions 130 are formed of strips of fabric. The fore ends 135 of the extensions 130 are secured to an area adjacent the open upper surface of end surface 115. The fore ends 135 may also be integrally formed with end surface 115 or secured thereto as shown. As shown, the extensions are positioned along the upper surface of end surface 115 and positioned laterally so as to co-extensive with the fasteners 120. As shown, the end surface includes a center panel 112 and two side panels 114. Fasteners 120 extend along or adjacent to longitudinal side edges of the center panel 112 and side panels 114. As shown, the center panel 112 extends in front of, or outwardly of, the side panels 112 but these may, of course, may be reversed.

In operation, the user may grasp the aft ends of extensions 130 and may be positioned away from the matter which will be dispensed from the interior cavity defined by the interior surfaces 230, whereby the distance will be substantially at least the predetermined length of the extensions 130. The user will exert forces, i.e., pull, the fore ends of extensions 130 thereby releasing the fasteners 120 and pulling the center panel 112 downward as shown in FIG. 4B.

According to an any aspect described herein and shown in FIGS. 1-6, the filter pad 100 may not include extensions 130. For example, FIGS. 5 and 6 depict a filter pad 100 without extensions. The operator may open the end surface 115 by any means, including, by way of example, the operator's own hands or a separate device (not shown) to expose the interior cavity of the filter pad 100.

As shown in FIGS. 2A and 2B, according to this modified aspect of the present invention, the end surface 115 is differently configured. The end surface 115 comprises two side panels 114 and the extension fore ends 135 are secured to the longitudinal inwardly facing edge, i.e., adjacent the center of the end surface 115. Fasteners 120, such as hook and loop as shown, extend longitudinally along this edge. Fastener 120 also extends laterally, across the open bottom edges of the side panels 114 and bottom surface 116 of the end surface 115. As shown, left side panel 114 overlaps right side panel 114, but these may be reversed as is apparent.

In operation, the aft end of extension 130 of the front overlapping panel (as shown, the left panel 130) is pulled to release the fasteners 120, thereby opening the left side panel 114 and disengaging from the right-side panel 114. The right-side panel 114 may then be opened by pulling the right fastener 120 to disengage the laterally extending bottom fastener 120 on the bottom surface 116.

As shown in FIGS. 3A and 3B, according to this modified aspect of the invention, the end surface 115 is differently configured than the aforementioned end surfaces 115. The end surface 114 includes a single panel 112 having a longitudinally extending fastener 120 along one side edge and a laterally extending fastener 120 along its bottom edge. The extension 130 is secured at its fore end 135 to the side surface of the center panel 112, positioned laterally adjacent its midline. As shown, the center panel 112 may be opened from the left, but this may be reversed as is readily apparent.

In operation, the user would provide force to the aft end of the extension 130 thereby releasing the longitudinally extending fastener 120, initially, and then releasing the bottom fastener 120 to open the end surface 115 in a book page-like manner. As such, the user is removed a distance at least equal to the predetermined length of the extension 130 and is removed from the discharge of any contents within the interior cavity 240.

The extensions 130 may be formed integrally with the filter pad 100, or separately formed and secured thereto. The extensions 130 may be formed of the same or different material than the filter pad 100. Extensions 130 are provided of a predetermined length to facilitate safe opening of the filter pad end surface whereby the user may avoid contact with the content egress from the container 200 and filter pad 100. The extensions 130 have a predetermined length sufficient for the extension 130 to be pulled by the user from a safe distance. For example, the predetermined length in FIGS. 1 and 4 may be at least as long as the height of the center panel 115 or at least as long as the width of the side panel 114 or one of the side panela 114 of FIGS. 2 and 3, respectively.

The aforementioned aspects of the invention have heretofore been described and shown with an extension 130 which is generally linear. It is within the spirit and scope of the present invention, however, to provide other configurations such as an extension having a variable width, such as a triangular configuration as shown in the provisional application herein by reference.

According to FIG. 5, selectively positioned separations define a modified end surface 115. The end surface 115 includes separations defining a pair of side panels 114 which are connected to the filter pad 100 along exterior side edges 117. The side panels 114 include medial side edges 118 which fold outward/inward from the exterior side edges 117. A bottom panel 120 extends from the filter pad 100 bottom surface and folds upward/downward. It is within the scope of the present invention, however, that the bottom panel 120 extends between filter pad 100 sides and extends downward so as be raised upwardly to open the end surface 115 (not shown). As shown, the bottom panel 120 folds upward and the side panels 114 fold inwardly, such as in front of the bottom surface 114 wherein the side panels 114 form the outermost layer, to close the end surface 115 of the filter pad 100. Snaps 125 or other fasteners are utilized to secure the panels of the end surface 115. For example, at least one, or a plurality of snaps 125 are provided along the exterior portions of the side panels 114 such as adjacent the medial side edges 118. Snaps 125 include mating male and female components on opposing side panels 114. To open the end surface 115, the snaps 125 are released by operator applied or operator directed forces which releases the side panels 114 and the bottom panel 120 retained by the side panels 114.

FIG. 6 depicts a filter pad 100 with a differently configured end surface 115. According to this aspect of the invention, a single side panel 114 is provided and extends from an exterior side edge 117 and substantially across the width of the filter pad end surface 115. As such, at least one, or a plurality of snaps 125 (as shown) are provided and which extend substantially along the height of the side panel 114 adjacent to an unsecured side edge 126. Mating connection members, such as the mating male or female snap portion, are positioned along a side surface of the filter pad. The bottom panel 115, folds upwardly (or downwardly, not shown) behind the side panel 114 so as to define an inner surface to prevent leakage from beneath to closed side panel 114. Accordingly, the width of the end panel 114 is greater than the width of the filter pad end surface 115 so that a portion of the side panel 114 adjacent the unsecured edge 126 extends around to the filter pad 100 side wherein the mating members, e.g., snaps, mate to secure the end surface 115.

By way of example and the discussion which follows with respect to FIGS. 1-9 are applicable to any end configuration shown and described. FIGS. 7-9 illustrate another aspect of the invention directed to securing members for securing the open, upper end of the filter pad to hooks or the like conventionally provided in containers to permit easy, safe and rapid removal of the filter pad. FIGS. 7-9 illustrate a securing member 300. According to one aspect shown in FIG. 7, the securing member 300 comprises a plurality of apertures 201 extending along the end panels, the center panel 115, both sides, and opposing closed end of the filter pad 100. The apertures 201 shown are by way of example and more or less may be provided, the apertures 201 may be equidistantly placed relative to one another or not and may be provided one all four sides of the filter pad 100 or on one, two or three sides. The apertures 201 are defined by a predetermined radius and are shown with the same radii. As shown in the drawing, 1" perforations are used, but it is understood that those skilled in the art that varying sizes can be used and the 1" size presented is not limiting. It is within the scope of the present invention for the apertures 201 to be non-uniform in size along the filter pad and to be of any configuration including no-round, e.g., a slit. The size, number, location, and shape of apertures 201 may be selected based upon the desires use and/or contents.

Prior to use, the filter pad 10 is positioned within the container 200 and the securing members 300, in the example of FIG. 7 the apertures 201, are positioned upon hooks (not shown) conventionally positioned along the inner surface of the container 200. After the filter pad 10 is filled, it is dewatered. The remaining debris may be dumped in a conventional manner from the end surface of the filter pad 10 as explained above with regards to FIGS. 1-6. Pulling the straps 130, for example, provides sufficient forces to tear the apertures 201 from any corresponding hooks of the container 200 if they have not previously slid off the hook during off-loading of the contents. The apertures 201 create a "weakened" surface area of the filter pad 10. As such, it is envisioned that in some instances, the filter pad 10 will tear about the apertures 201 if any apertures 201 remain positioned on a container hook and the filter pad 10 may slide out of the container due to the weight of the dewatered debris. If not, the filter pad 10 may be rapidly, easily, and safely removed by mere pulling forces wherein any apertures 201 remaining on the hooks of the container will tear or slide off. Therefore, no knives or other devices are needed for easy removal. Moreover, the entry into the container 200 is avoided.

According to one aspect shown in FIG. 8, the securing member 300 includes a removal band 203 which extends around the open, upper periphery of the filter pad 10. The removal band 203 is formed of a material different from the material forming the filter pad 10. It may be integrally formed therewith or added, such as with as seam. For example, it may be formed of a PET material having a predetermined tensile strength, rope, or other fabric. The strap can be of varying nominal sizes, depending upon the application. As shown in the drawing, a 3" strap is used, but it is understood that those skilled in the art that varying sizes and materials can be used and the 3" size presented is not limiting.

The filter pad according to FIG. 8 operates similarly to that described as to FIG. 7. A removal band 203 is formed of a material which is intermittently secured, such as by a sewn seam, to the filter pad, to produce a compartment configured for receipt of the hooks of the container 200. For example, if the filter pad length is 21 feet, the removal band 203 may be secured to the filter pad 10 at 3-foot increments. The compartments are sized and shaped for receipt of the container hooks and for easy removal from the container hooks, such as during the emptying or off-loading process. Alternatively, the strip is formed of a material different than that of the filter pad 10, such as one that has a lower tensile strength, whereby the removal band more readily tears during the off-loading process. The filter pad 10 and container 200 is filled with material, it is dewatered, and the contents dumper as previously discussed. The weight of the debris and/or dumping process may release the removal band 203, such as by easy removal and/or tearing, and the filter pad 10 will be dumped out with the dewatered contents. If not, easy, safe and rapid removal is achieved by mere pulling of the filter pad 10 without requiring unsafe and unsanitary entry into the container.

According to another aspect of the invention, as shown in FIG. 9, the securing member 300 comprises a plurality of spaced apart loops or flanges 205. Flanges 205 are formed contiguous with the filter pad 10 so as to have a non-linear open upper edge of the filter pad 10. Alternatively, they may be secured to the filter pad 10. The flanges 205 may be positioned over the hooks to penetrate the flanges 205. The flanges 205 are configured to be sized and shaped to readily slip off the container hooks during the off-loading process. If any flanges 205 are not immediately disengaged from the container hook, it may be readily torn. The operation according to FIG. 9 is similar to that previously described. While not intending to be bound by any particular theory, it is believed that configuration of the flange 25 provides a filter pad portion having lower tensile strength than the remaining portion of the filter pad. It may also be formed of a material with similar tensile strength, but which is configured to readily tear, such as perforations. That is, its decreased area renders it easier to remove such as by tearing or slipping off the hooks.

Although several aspects of the invention have been disclosed in the foregoing specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described invention.

What is claimed is:

1. A filter pad for use with a dewatering container having a bottom and a plurality of sides, the bottom and sides having interior surfaces, and securing hooks on upper edges of the sides wherein the interior surfaces define an interior cavity for receipt of contents to be dewatered and wherein one of the sides comprises a door to permit ingress and egress into the interior cavity comprising:
   a filter pad configured to fit within the interior cavity and substantially line the interior surfaces, the filter pad comprising an end surface configured to selectively open and close and positioned on said filter pad for placement substantially adjacent the door to permit selective egress of dewatered contents of the interior cavity and an upper end which is substantially open; and
   a securing member extending adjacent said filter pad upper end configured to cooperate with the container hooks, said securing members being configured to easily release from the container hooks upon application of forces for easy removal from the hooks, and said securing member is formed of a first material having a first tensile strength selected to be sufficiently low so as to tear from the container hooks upon application of shearing forces applied as the dewatered contents egress through said filter pad end surface when the contents are offloaded.

2. The filter pad according to claim 1 wherein said securing member comprises a plurality of apertures configured to cooperate with the container hooks.

3. The filter pad according to claim 2 wherein said apertures are substantially circular.

4. The filter pad according to claim 2 wherein said apertures are positioned on at least two sides of said filter pad.

5. The filter pad according to claim 4 wherein said apertures are positioned on four sides of said filter pad.

6. The filter pad according to claim 1 wherein said securing member extends along at least two sides of said filter pad upper end.

7. The filter pad according to claim 6 wherein said securing member extends along four sides of said filter pad upper end.

8. The filter pad according to claim 1 wherein said securing member comprises a plurality of extensions configured to cooperate with the container hooks.

9. The filter pad according to claim 8 wherein said extensions are positioned on the upper end of at least two sides of said filter pad.

10. The filter pad according to claim 9 wherein said extensions are positioned on the upper end of four sides of said filter pad.

11. The filter pad according to claim 1 wherein said end surface comprises at least two separations defining at least one end panel and a fastener for selectively securing said end panel in a closed position whereby forces applied to said filter pad releases said fastener and said end panel is moved from a closed to open position.

12. The filter pad according to claim 1 wherein said securing member comprises a plurality of apertures configured to cooperate with the container hooks.

13. The filter pad according to claim 12 wherein said apertures are substantially circular.

14. The filter pad according to claim 13 wherein said apertures are positioned on at least two sides of said filter pad.

15. The filter pad according to claim 14 wherein said apertures are positioned on four sides of said filter pad.

16. The filter pad according to claim 12 wherein said filter pad is formed of a first material having a first tensile strength and said securing member is formed of a second material having a second tensile strength wherein said second tensile strength is less than said first tensile strength.

17. The filter pad according to claim 16 wherein said securing member extends along at least two sides of said filter pad upper end.

18. The filter pad according to claim 17 wherein said securing member extends along four sides of said filter pad upper end.

19. The filter pad according to claim 12 wherein said securing member comprises a plurality of extensions configured to cooperate with the container hooks.

20. The filter pad according to claim 19 wherein said extensions are positioned on the upper end of at least two sides of said filter pad.

21. The filter pad according to claim 20 wherein said extensions are positioned on the upper end of four sides of said filter pad.

* * * * *